United States Patent [19]

Fechalos et al.

[11] 4,154,988
[45] May 15, 1979

[54] METHOD AND MEANS FOR ACCESSING PROGRAM MEMORY OF A COMMON CONTROL TELECOMMUNICATIONS SWITCHING SYSTEM

[75] Inventors: William A. Fechalos, Naperville; Byung C. Min, Bolingbrook; Satyan G. Pitroda, Villa Park; Carl J. Stehman, LaGrange, all of Ill.

[73] Assignee: Wescom Switching, Inc., Oakbrook, Ill.

[21] Appl. No.: 844,290

[22] Filed: Oct. 21, 1977

[51] Int. Cl.² ..................... H04M 3/42; H04Q 3/54
[52] U.S. Cl. .......................... 179/18 B; 179/18 D; 179/18 ES
[58] Field of Search .............. 179/18 B, 18 BE, 18 D, 179/18 DA, 175.2 C, 175.2 R, 18 ES

[56] References Cited

U.S. PATENT DOCUMENTS

| | | | |
|---|---|---|---|
| 3,389,234 | 6/1968 | Cotner | 179/18 BE X |
| 3,485,957 | 12/1969 | Pearce | 179/18 BE |
| 3,553,382 | 1/1971 | Knox et al. | 179/18 DA |
| 3,600,522 | 8/1971 | Benson | 179/18 BA |
| 3,689,703 | 9/1972 | Allen et al. | 179/18 B |
| 3,692,951 | 9/1972 | Hestad et al. | 179/18 DA X |
| 3,934,095 | 1/1976 | Matthews et al. | 179/18 D |
| 3,959,600 | 5/1976 | Sousa | 179/18 BE |

FOREIGN PATENT DOCUMENTS 1138925  1/1969  United Kingdom ............... 179/18 BE Primary Examiner—Thomas W. Brown
Attorney, Agent, or Firm—Leydig, Voit, Osann, Mayer & Holt, Ltd.

[57] ABSTRACT

A method and means for providing a remote data station with access to the program memory of a stored program common control telecommunications switching system. The control complex has an input/output port and a modem for interfacing that port with its switching network. The control has the capability of setting up connections in the network between the modem and a selected trunk. Incoming connections to the modem are given only limited access to the stored program control, that access for the purpose of analyzing incoming data to detect a predetermined code. In the event the predetermined code is detected, the incoming connection is taken down, and an outgoing connection established to a distant station by dialing the number of an authorized station which is stored in the program memory. Full access to the program memory is then allowed, such that full access is provided only to stations whose telephone numbers are stored in the memory of the switching exchange.

11 Claims, 8 Drawing Figures

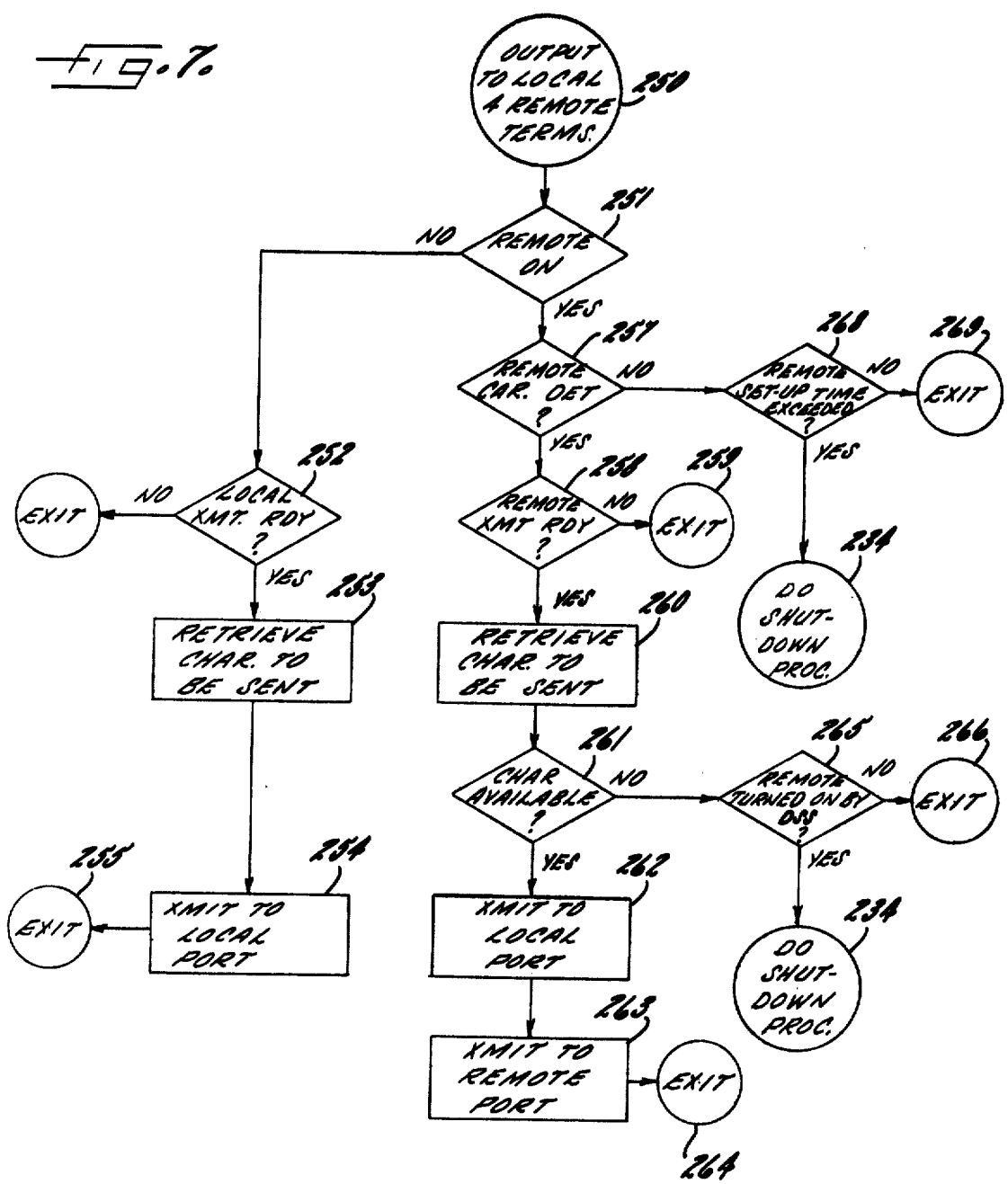

METHOD AND MEANS FOR ACCESSING PROGRAM MEMORY OF A COMMON CONTROL TELECOMMUNICATIONS SWITCHING SYSTEM

This invention relates to stored program common control switching systems, and more particularly to a method and means for providing data access to the control complex.

Telephone switching systems have evolved to include various forms of computerized common controls of the programmable or stored program variety. Some of the popularity of these stored program systems is due to the flexibility they provide, for example, allowing the feature package or the system configuration to be altered simply by changing the program, without the necessity for hardware changes. Naturally, changing the program requires that some access be provided to the program memory. Many of the stored program common controls also have reporting features, whereby they keep track of information such as traffic data and print it out on command, periodically check the system circuitry and report on system faults, and the like. This too, requires, some access be provided between the stored program common control and a data terminal.

It is not overly complicated to provide a local data terminal at the switching system, connected to an input/output port of the common control for providing the aforementioned data access. This is convenient, for example, for output of certain types of data to be used right at the switching exchange, for input of simple recent changes, and the like.

Remote data access has also been provided, as is useful, for example, to an operating company which maintains a number of dispersed stored program common control switching systems and desires to oversee all of such systems from a single location. Remote access is also useful for troubleshooting system faults, allowing a single comparatively skilled craftsperson at a central station to service a number of dispersed switching systems, rather than leaving such service in the hands of a group of lesser skilled craftspersons dispersed with the switching systems.

However, remote access introduces a potentially serious security problem. Providing data access to the program memory for unskilled persons, or those with destructive intentions, can have devastating effects, including disabling of the entire switching system.

For that reason, various security measures have been implemented with the intention of denying access to unauthorized persons. One way of accomplishing that is to require a person attempting to access the common control to input a multi-digit access code, which is checked for a match before access is allowed. If the correct code is received, the calling station is then allowed unrestrained data access to the common control. Any person having possession of the code, whether that possession is authorized or not, can thus gain access to the heart of the switching system from any telephone station.

With the foregoing in mind, it is a general aim of the present invention to provide a remote access system which is more secure than those known heretofore. More specifically, it is an object to provide access to the program memory only to authorized stations rather than persons, and to maintain the identity of those authorized stations in the common control itself.

It is a detailed object of the invention to provide a remote access system for a common control telecommunications switching system, wherein a request connection is established to provide a data link between a requesting station and the common control solely for the purpose of checking incoming data to determine if full access should be granted, and if it should, establish an access connection by taking down the request connection, dialing up a new connection from the common control to a remote station whose number is stored in the common control, and providing full access to that remote station when it answers.

Further there is provided a method of controlling access to the common control from an authorized remote station by storing the telephone number of the remote station in the program memory of the common control, responding to an incoming call by providing limited access only to search for an identity code, responding to receipt of the identity code by establishing an outgoing connection using the stored telephone number, and providing access to said remote station when it answers.

Other objects and advantages will become apparent from the following detailed description when taken in conjunction with the drawings in which:

FIGS. 4-7, are flow charts illustrating the programs which constitute the program memory of the control complex as means for performing the remote access function.

While the invention will be described in connection with an embodiment presently considered to be preferred, there is no intent to limit it to that embodiment. On the contrary, the intent is to cover all alternatives, modifications and equivalents included within the spirit and scope of the invention as defined by the appended claims.

Figure 1:
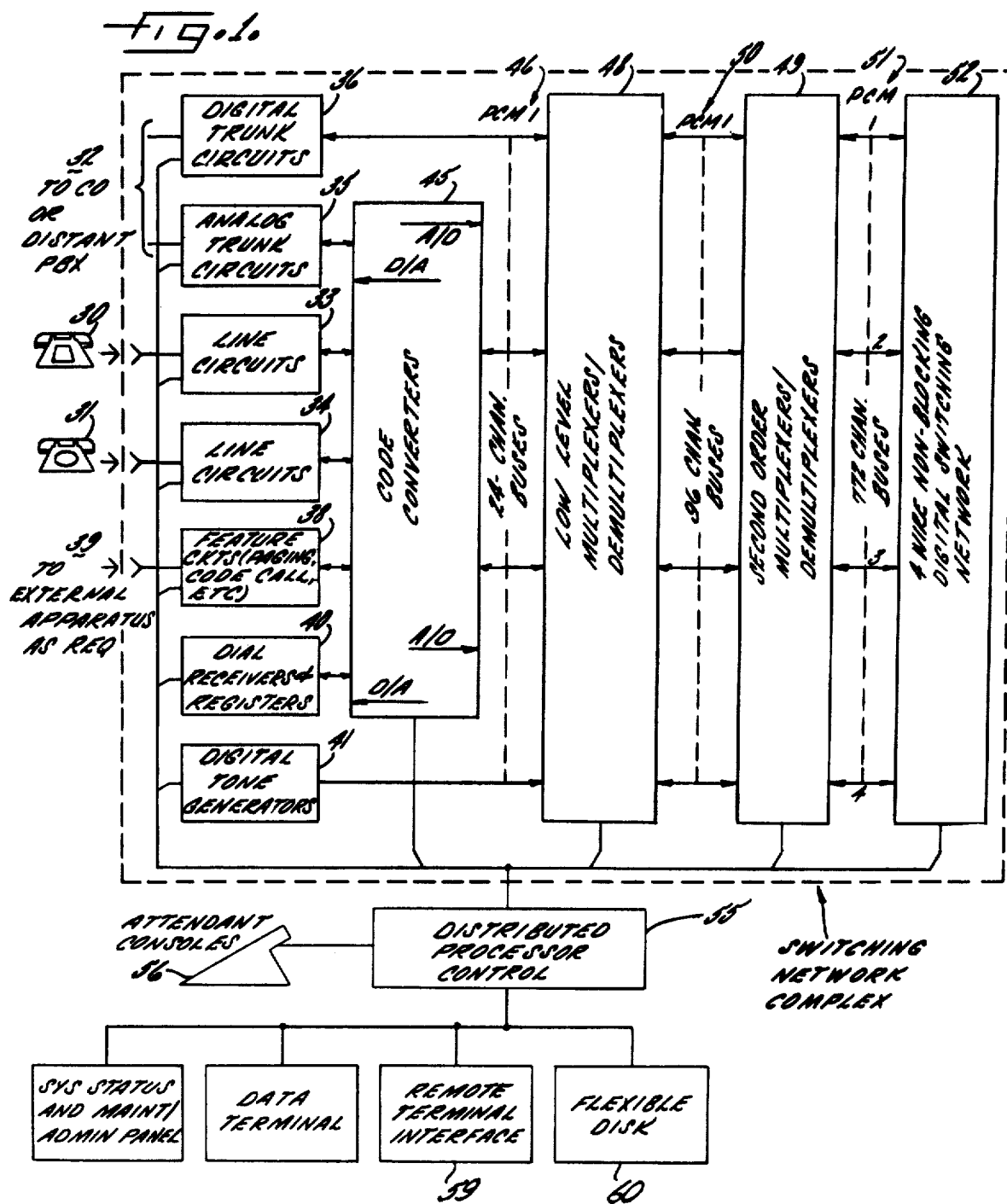
FIG. 1 is an overall block diagram of a common control telecommunications switching system providing an exemplary environment for the present invention.

Referring now to FIG. 1, there is shown a block diagram of a telecommunications switching system of the stored program variety which will serve as an exemplary environment for the remote access system according to the present invention. It should be noted at the outset, however, that the remote access system is adaptable to stored program controls for numerous other types of telecommunications switching systems.

The illustrated telecommunications switching system is adapted to connection to a plurality of lines represented by telephone instruments 30, 31 and also to a plurality of trunks generally indicated at 32. Circuitry is provided to interface the lines and trunks to the switching system, such circuitry being represented by line circuits 33, 34, analog trunk circuits 35 and digital trunk circuits 36. Since the switching system is of the four wire variety, the line circuits 33, 34 and the analog trunk circuits 35 include hybrids for converting the two wire line signals to four wire for use by the switching system. Additionally, the line circuits 33, 34 and the trunk circuits 35 include appropriate sense points for indicating the status of the lines or trunks to which they are connected and also appropriate control points for allowing the switching system to control the status thereof. Digital trunk circuits 36 may be provided, when desired, for directly interfacing a T1 digital line to the switching system without the need for code conversion of any sort.

In addition to establishing and maintaining "standard call" connections between lines and trunks, the system is capable of providing additional features where desired, the apparatus for effecting such features being represented by element 38. For example, the system may be configured to carry out, as optional functions, paging, code call, multi-port conferencing and the like. Additional apparatus is required, for example audio equipment for use with the paging feature, is indicated generally at 39.

Means are provided for receiving and storing dialed digits for use by the control complex in establishing connections between the lines and trunks as required. Such equipment, generally indicated at 40, may include both dial pulse receivers and DTMF receivers, the general term dial receivers being used to encompass both. In addition, the equipment includes registers for storing the digits as they are received.

In order to inform a user of the response of the system to his request, progress tones are required, such tones in the instant embodiment being produced by digital tone generators 41. The tones produced by such generators include dial tone, ring back, busy tone and the like. While analog tone generators may be utilized, the digital tone generators 41 of the instant embodiment eliminate the need for code conversion, and are therefore directly compatible with the switching system.

As noted above, the switching system is configured as a four wire digital system, and therefore requires conversion between the analog information on the trunks and lines to a digital format. To that end, a plurality of code converters are provided indicated generally at 45. In the preferred embodiment the digital code utilized is compatible with North American Industry standards, utilizing an eight-bit format, a 1.544 megabit transmission rate and compression with $\mu$ equal to 255. As a result the code converter block 45 may be comprised of a plurality of rather conventional T1 PCM code converters, each capable of handling 24 channels, and each providing analog to digital conversion in the direction toward the network and digital to analog conversion in the direction toward the lines and trunks. A practical embodiment of the illustrated switching system was built to handle a maximum capacity of 3088 channels, 3072 active channels and 16 lost to framing. Such a system would require approximately 128 code converters, each capable of handling twenty-four channels, thereby providing at the output of the code converters 45 a plurality of PCM buses 46, each carrying bidirectional information for 24 channels. In the 3088 channel system, there are approximately 128 of such busses, and each bus is implemented as a pair of oppositely directed unidirectional buses.

In order to properly route the coded signal samples from the lines to the network for efficient switching, and from the network to the lines for distribution, a pair of multiplexers are provided, indicated as first order or low level multiplexer 48 and second order or high level multiplexer 49. The low level multiplexer 48 time sequences the incoming information from the code converters onto thirty-two buses 50 each carrying serial information for 96 channels, and demultiplexes the signals flowing in the opposite direction. The high level multiplexer 49 receives the information on the 32 incoming buses, converts it to parallel and arranges it on four parallel buses 51 each carrying information for 772 channels. The high level demultiplexer performs the complementary function in the opposite direction. The four 772 channel buses are provided to the four wire non-blocking digital switching network 52 which serves to switch in time information from selected channels for the purpose of completing connections between those channels.

The configuration of the digital switching network itself is known, being explained, for example, in "A Review of Telecommunications Switching Concepts—Part 1" and Part 2 thereof, published in Telecommunications February 1976 and March, 1976, respectively. Suffice it to say that the network, or each block thereof includes an information memory having individually addressable locations for each channel in the system. Information received and processed through the code converters is multiplexed onto the appropriate buses where each channel occupies a dedicated time slot. This information is sequentially written into the dedicated memory locations, with all samples being updated each 125 microseconds. For the purpose of making connections, the network, or each block thereof includes one or preferably two connection memories, each having an addressable location dedicated to each channel in the system. A connection is established by writing "paired numbers" into the connection memory. The address of the first line is written at the location assigned to the second line, and vice-versa to "connect" the first and second lines. Thereafter, during the time slot for the first channel the information memory is written with the data from that channel and also data is read out of the information memory of the address established by the connection memory, thereby placing the sample from the second channel into the time slot for the first channel for return to the first channel. Subsequently during the occurrence of the time slot for the second channel a similar operation takes place, with the result being that samples from the two channels are swapped in time causing the first channel to receive samples from the second channel and vice versa. In short, a communication path is established. It should also be noted that a "listening connection" can be set up by writing only one connection into the memory.

In order to efficiently accommodate the 3072 channels, the network is preferably broken into four blocks. Each block writes information to only one fourth of the total number of channels, that is 772 channels. However, to provide full availability, information from each channel is written into each of the four blocks.

Control Complex

The interaction between the elements of the system described thus far is under the control of the distributed processor control complex 55. Stated generally, the control complex detects requests for service from lines, trunks and the like, determines available class of service for those elements and completes connections in the network. To that end the distributed processor control complex 55 has circuit connections to the line circuits 33, 34, and specifically to sense points thereof for detecting the on-hook or off-hook condition of the lines and changes between such conditions. Circuit connections are also provided to control points on the line circuits and can be used, for example, to initiate or terminate ringing to selected lines, to set attenuators in the transmission path, or the like. The complex 55 also has circuit connections to the trunks, and specifically to the sense points for detecting the conditions thereof and to control points for controlling the trunks. Similar connections are provided to the feature circuits 38. Circuit connections between the control complex and the dial receivers and registers 40 are used to cause those receivers to collect dialed digits, and to receive the collected digits for the purpose of completing connections. The complex 55 also has circuit connections to the digital tone generators 41, the code converters 45 and the multiplexers 48, 49 for exercising appropriate control over those elements. Connections are also provided between the complex 55 and the network 52 for allowing the complex to write addresses into the connection memories for the purpose of establishing connections between the access ports.

Additionally, the system makes provision for attendant consoles 56 which typically include an array of indicators or readouts for informing an attendant of system conditions, combined with an array of pushbuttons for allowing the attendant to cause the system to perform specific functions.

Data Terminals

The control complex 55 interacts with the elements described thus far to cause the switching system to execute the desired functions under the control of the program stored in its program memory. The elements to be considered now are also connected to the control complex 55, but may be considered data terminals since their main function is not call processing, but communication of data between the control complex 55 and the outside world. A system status and maintenance administration panel 57, generally located in the equipment frame, is used to inform a craftsperson of the operational status of the equipment. A magnetic backup medium is provided in the form of a flexible disc 60 which stores the operating program for the system, is actuated to initially load the program, and may be automatically actuated to reload the program in the event of a major system failure. A data terminal 58, and a remote terminal interface 59 are connected to the control complex 55, for communication therewith. These elements are the most flexible access ports to the program memory. They are used, for example, for entry of data such as recent changes, and for output data such as traffic information or failed equipment lists. They also are the ports by which a craftsperson can gain access to the program memory for troubleshooting system faults.

The data terminal 58 is typically located in the same area as the switching system equipment frames, and therefore does not present much of a security problem. The remote terminal interface 59, however, communicates between the control complex 55 and a remote station via the public telephone system, and potentially presents the kind of security problem discussed above.

Exemplary Control Complex

Before turning specifically to the remote access system, attention will first be directed to the structure of the exemplary control complex 55. This description is given in order to illustrate the interaction between a specific type of control complex and the remote terminal. However, as noted above, the instant invention is usable with control complexes of many sorts, and, therefore, the description of the control complex herein is not to be taken as limiting in any way.

Figure 2:
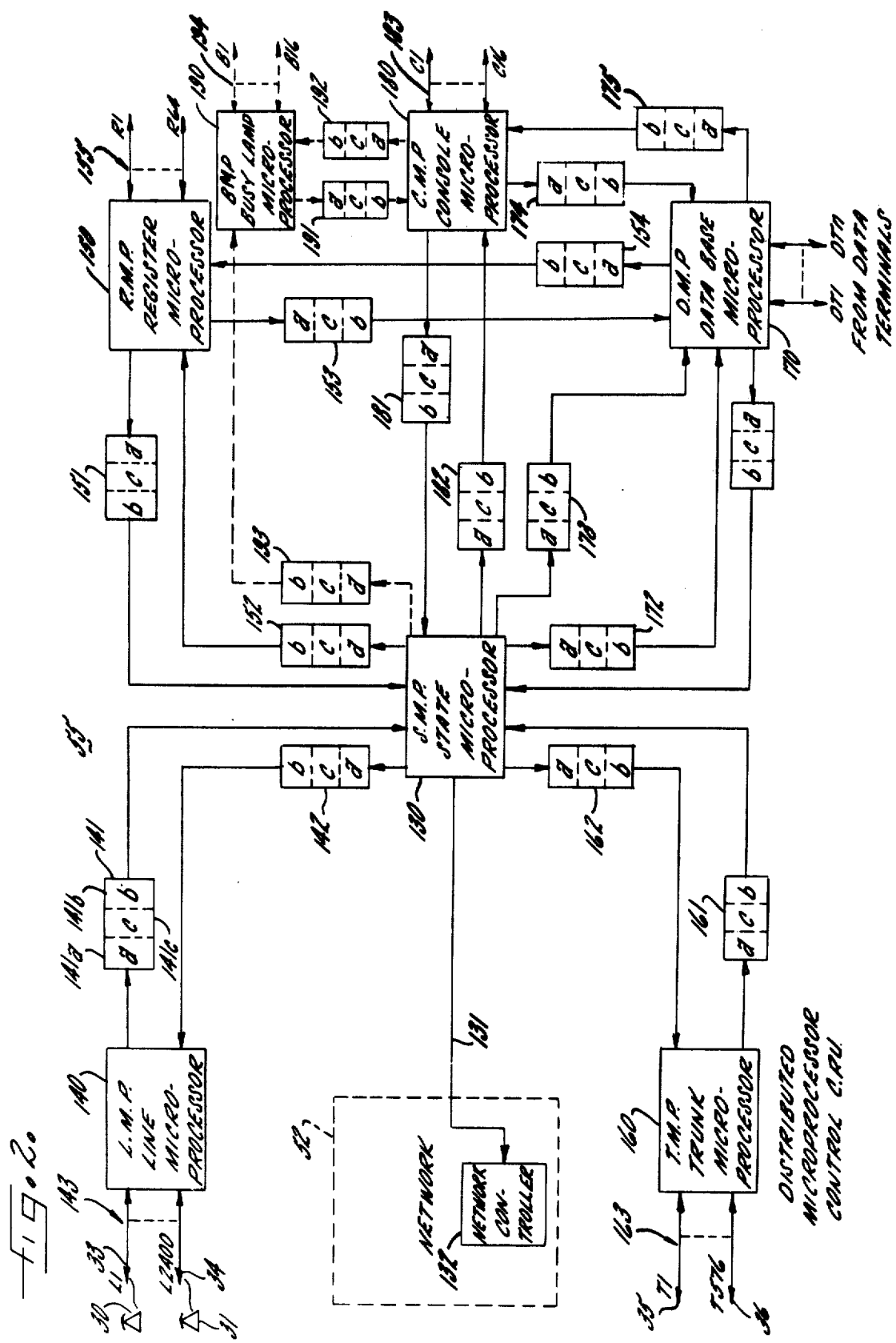
FIG. 2 is a block diagram showing the arrangement of the control complex portion of the switching system of FIG. 1.

Turning now to FIG. 2, there is shown the architecture of the distributed control complex described in Pitroda et al. U.S. application Ser. No. 842,091, filed Oct. 17, 1977, and assigned to the assignee of the present invention. The control complex will be described only briefly herein, and further reference may be made to said application, the disclosure which is incorporated herein by reference.

As shown in FIG. 2, the functions of the switching exchange are distributed among a plurality of microprocessor control units including state microprocessor 130, line microprocessor 140, register microprocessor 150, trunk microprocessor 160, data base microprocessor 170, console microprocessor 180, and an optional busy lamp microprocessor 190. Communication paths between partner processors are established by interprocessor buffers, for example, interprocessor buffer 141 communicating data from the line microprocessor 140 to the state microprocessor 130. The interprocessor buffer includes a send side control 141a for effecting transfer of data from a sending processor, a receive side control 141b for effecting transfer of data to a receiving processor and intermediate storage 141c independently accessed by the sending and receiving processors. The structure and operation of each of the microprocessor control units will be dealt with briefly below.

Line Microprocessor LMP

The line microprocessor 140 is provided with bidirectional communication paths 141, 142 for communicating with the state microprocessor 130. In the illustrated configuration the line microprocessor 140 need not communicate with any of the other microprocessors. The function of the line microprocessor is to service the line circuits by detecting requests for service and communicating those requests to the control complex, and by exerting some control over the line circuits, in the illustrated embodiment such control being the initiation or termination of ringing on the lines or the setting of attenuators in the voice paths. To that end the line microprocessor 140 has circuit connections to the line circuits 33, 34 to which the telephone instruments 30, 31 are connected. The circuit connections to the line circuits are specifically an array of sense and control points which the microprocessor is capable of addressing as memory. The sense points are controlled by the respective line circuits to indicate the busy or idle status of the associated line. The line microprocessor continues to scan the sense points to detect significant changes of state, and to communicate such state changes to the state microprocessor via the interprocessor buffer 141. As a result, the system is capable of detecting requests for service, call terminations, hook switch flashes, dial pulses and the like.

The circuit connections 143 are illustrated as bidirectional, indicating that the line microprocessor is also capable of sending data to the line circuits. In the illustrated embodiment, this feature is used to control ringing in the lines. When the control complex determines that a particular line is to be rung, that fact is communicated by task signals sent to the line microprocessor 140 by the state microprocessor 130 via the interprocessor buffer 142. The line microprocessor 140 responds by addressing the word including the line circuit of interest and writing the control point of the particular line circuit in that word which sets a latch to apply an external ringing generator to that line. The line microprocessor continues to perform other tasks while the line is being rung. If the party answers, the line circuit detects the on hook to off hook transition during the normal scanning of the sense points just as the initial request for service was detected. It communicates that fact by sending task signals to that state microprocessor via the interprocessor buffer 141, and it also writes the appropriate control point to reset the aforementioned latch and terminate ringing in the answering line. Although the description of that operation might take some moments to read, the operation itself is carried out almost instantaneously.

Trunk Microprocessor—TMP

For performing operations analogous to those of the line circuit for the trunks in the system, the trunk microprocessor 160 is provided with bidirectional communication paths 161, 162 to the state processor and bidirectional circuit connections 163 to sense and control points in the trunk circuits 35, 36. Just as with the sense and control points of the line circuits, the sense and control points of the trunk circuits are addressable as memory. Because trunk operation is somewhat more complex than line operation, each trunk circuit has four sense and four control points. Accordingly, if the sense and control points are configured as eight bit words as in a line circuit, each word will accommodate only two trunks.

The trunk microprocessor 160 continually scans the sense points via circuit connections 163 to detect significant sense point transitions. Upon detection of such a transition, an appropriate task message is configured and relayed to the state processor 130 via interprocessor buffer 161. Because of the wide variety of trunk types and signaling protocols, the trunk microprocessor must reduce all trunk signaling for any trunk type to a common set of standard messages such as trunk seize, trunk disconnect, stop dial, etc. Upon receipt of such a task message the state processor 130 determines the appropriate action, configures an appropriate control message to carry out such action, and communicates such control task message to the trunk microprocessor 160 via the interprocessor buffer 162. The trunk microprocessor 160 executes its task by writing the appropriate control point of the trunk is question via the circuit connections 163.

Register Microprocessor—RMP

As noted previously the system includes a plurality of dial receivers and registers for receiving dialed information from the various network ports by way of the network. For receiving and analyzing dialed information, a register microprocessor 150 is provided having bidirectional communication paths provided by interprocessor buffers 151-154, and circuit connections 155 (readable as addressed data memory) to the registers in the system. When the state microprocessor 130 determines that dialed digits are to be received, after connecting an idle receiver to the originating station, it sends a message to the register processor via the interprocessor buffer 152 defining the type of digits to be collected. The register processor monitors the receiver dial pulses or DTMF tones via the circuit connections 155 until the first digit is recorded. Once recorded, the first digit is sent to the data base processor via the interprocessor buffer 153 with a request for a first digit translation to define the number of digits to be received. The register processor 150 continues to receive digits and awaits a reply message from the data base microprocessor which is communicated via the interprocessor buffer 154. The register processor takes in the expected digits, and after all digits have been received sends them along with identifying information to the data base processor via the interprocessor buffer 153. Thereupon the data base processor communicates with the state processor 130 for completing the connection.

The register microprocessor also cooperates in performing the "speed dial" function to be described below. In that connection, it should be noted that each receiver is actually a receiver/sender having the capability of providing an on-hook or off-hook indication back toward the network. In performing speed dial, the register microprocessor controls this sender function to outpulse digits provided from the data base microprocessor.

Data Base Microprocessor—DMP

The data base microprocessor 170 stores within its program memory all class of service and number translation tables for the system. In response to the aforementioned task message from the register processor via the interprocessor buffer 153 requesting a first digit translation, the data base microprocessor 170 determines from such tables (which define the local numbering plan) the number of digits to be received, and prepares a message for the register microprocessor to be transmitted via the interprocessor buffer 153. Subsequently the data base microprocessor receives all of the digits from the register microprocessor via the interprocessor buffer 153 and performs a dialed number translation on the digits by appropriate reference to the aforementioned tables to determine the network slot number of the dialed station along with the class of service information for both the dialed and dialing station. It configures an appropriate message including this information and transmits that message to the state microprocessor 130 via the interprocessor buffer 171.

The data base microprocessor, for its function in speed calling has data tables which are memory means for storing the telephone numbers of particular distant stations. In response to a command message requesting speed dialing to a particular one of such numbers, it looks up the stored number and sends it to the register microprocessor for outpulsing the appropriate digits.

The data base processor also provides the input ports for external data entering the system from the system status and maintenance administration panel 57, data terminal 58, remote terminal interface 59 and flexible disc 60 described in connection with FIG. 1. Such circuit connections are represented at 176, wherein the aforementioned elements 57-60 are referred to generally as data terminals.

State Microprocessor—SMP

As can be appreciated from the number of times the state microprocessor control 130 has been mentioned thus far, it is a focal point of the control complex in that it communicates with each of the other microprocessor controllers. The state microprocessor maintains a record of the current state of activity of each line, trunk and register in the system. Incoming interprocessor buffer messages from the various controllers inform the state microprocessor of progress by devices in the system. As a generality, the state microprocessor considers the current state of a device and the devices to which it is connected, the current incoming interprocessor buffer message, and the relevant class of service information to determine what next state the device in question should acquire. Having determined the next state, it causes the device to assume that state either through appropriate interprocessor buffer messages to partner processor processors, or by way of establishing connections in the network. The state microprocessor has circuit connections indicated at 131 to the network 52, and specifically to network controller 132 which is illustrated as a portion of the network. The network controller 132 serves to interface the state microprocessor output lines to the network, and specifically to the connection memories for the purpose of setting up or taking down connections. The state processor writes two types of data into the network controller. The first type is the connection memory address at which a new connection is to be written. The second type is the actual connection data to be written at that address. The network controller 132 accepts this information and at the appropriate point in the cycle of the network writes the connection. The network is thus available to the state microprocessor and addressable as memory for the purpose of establishing connections between the ports in the system.

Console Microprocessor—CMP

For interfacing the control complex to one or more attendant consoles, up to a maximum of 16, circuit connections indicated at 183 are provided interconnecting such consoles to the console microprocessor 180. It should be noted in passing that attendant consoles are not necessary to the operation of the system but are provided only when desired. The console microprocessor receives messages corresponding to button pushes at the attendant consoles via the circuit connections 183, analyzes the messages, and returns messages that will light appropriate lamps on the attendant consoles via the circuit connections 183. In addition, the console microprocessor sends commands to the state processor 130 via the interprocessor buffer 181 to keep the state processor properly informed of device states, and to request the state processor to make appropriate connections. The console microprocessor 180 also receives messages from the state processor 130 via interprocessor buffer 182, such commands directing the console processor to attend certain calls.

The console microprocessor also communicates with the data base microprocessor 170 via interprocessor buffer 174, for example to request console class of service, and receives messages from the data base microprocessor via the interprocessor buffer 175, for example, responses to class of service requests.

Busy Lamp Microprocessor—BMP

It was noted above that an optional busy lamp field may be provided with the attendant's console to indicate the status and allow direct station selection for selected ones of the system lines within particular groups. To accomplish that it is necessary to provide communication between the busy lamp microprocessor 190 and the console microprocessor 180, such communication being accomplished via interprocessor buffer 191 communicating requests by the busy lamp microprocessor to the console microprocessor, and by interprocessor buffer 192 communicating requests or messages in the opposite direction. In addition, the busy lamp microprocessor has simplex communication with the state microprocessor via the interprocessor buffer 193, such buffer allowing the state microprocessor to issue commands to the busy lamp microprocessor. The busy lamp microprocessor has circuit connections 194 to the busy lamp field/direct station select consoles, the connections 194 indicating that up to 16 busy lamp field consoles may be provided.

Data Access to the Control Complex

Figure 3:
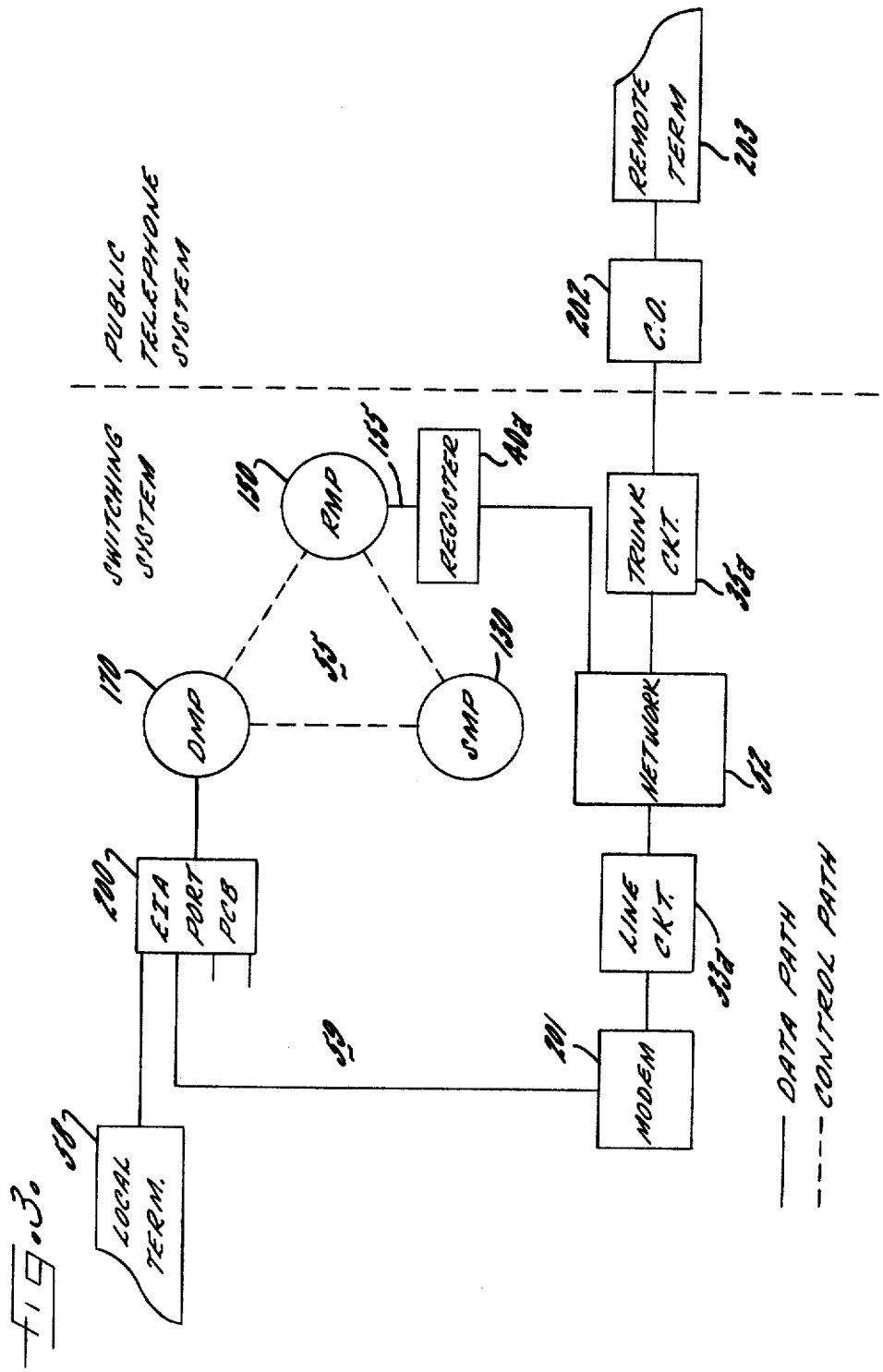
FIG. 3 is a block diagram illustrating a portion of the control complex of FIG. 2, and showing an embodiment of the remote access system for use with that control complex.

Turning now to FIG. 3, there is shown in block diagram form elements of the switching system of FIGS. 1 and 2 involved with providing data access to the program memory of the switching system. Within the control complex itself, the state microprocessor 130, the register microprocessor 150, and the data base microprocessor 170 carry out the majority of the control functions. The data base microprocessor 170 is the entry port for data, and for that purpose has an EIA port 200 for communication between the data terminals and the control complex. The EIA port 200 has the local terminal 58 connected directly thereto such that when the local terminal is turned on, data exchange is enabled between that terminal and the control complex.

For communicating with a remote station, means are provided for interfacing the switching network 52 with the port 200, such means being shown herein as a modem 201. The modem is connected to the network 52 via one of the line circuits 33a, the code converters, multiplexers and the like being omitted from FIG. 3 in the interest of clarity. It will be apparent, however, that the illustrated arrangement provides means for establishing connections in the network 52 between the modem and another network port, such as trunk circuit 35a. As shown in FIG. 3, the trunk circuit is connected to a trunk in the public telephone system, and via connections established in a central office 202 to a remote terminal 203. Accordingly, when the appropriate connection is set up in the network 52 (as well as at the central office 202), the remote terminal 203 is provided with data access to the control complex via the modem 201. Whether the access provided will be limited (for the purpose of determining identity) or general (for the purpose of data transfer) is determined by the manner in which the connection is set up.

Before describing exactly how that is accomplished, additional detailed information will be given on the presently preferred embodiment. It will be apparent, however, that this detailed information relates only to the specific embodiment, and may be modified without departing from the scope of the present invention.

In the embodiment of FIG. 3, the EIA port 200 provides communication to both the local and remote terminals in parallel. In effect, the control complex 55 treats the two ports as if they were one. Any character sent to the local will also be sent to the remote (if the appropriate connection is set up in the network) and vice versa. Characters received from either terminal are loaded into a single input buffer and also a single echo buffer so that input data from either terminal is echoed to both. Operating the terminals in this manner will inform a user at one that the other terminal is sending data, so that the first user can tailor his activities accordingly.

The present embodiment also provides for a maximum of three remote terminals 203. Any of those terminals can be connected in the network 52 to the line circuit 33a and thereupon via the modem 201 to the control complex 55. A connection can be automatic by utilizing a direct inward dialing DID trunk, whereupon a remote station dialing a predetermined telephone number is automatically connected by the switching system to the line circuit 33a. Alternatively, a connection to that line circuit may be set up by an attendant, in response to a request for connection to the predetermined directory number associated with data access. If a second remote terminal attempts to access the program memory while a first is connected, the state microprocessor will determine that the line circuit 33a is busy and return busy tone to the second remote terminal.

Each of the remote terminals has its own telephone number, and the respective telephone numbers are stored in the speed calling tables of the data base microprocessor 170. When one of the remote terminals calls into the switching system, a "request connection" is set up in the network between the incoming circuit and the modem. The remote station must then identify itself, by typing in a predetermined identity code, which is associated with its stored telephone number in the speed calling table. In contradistinction to prior remote access systems where the identity code must be rather lengthy for purposes of security, in the instant system only a single digit is required because access will be granted only to stations whose telephone numbers are stored in memory. Accordingly, if a person attempts to gain access to the common control from an unauthorized station, even if he dials in a valid identity code, the switching system will respond by attempting to set up an access connection to the appropriate authorized station. If the authorized station to which the connection is set up has no data to transfer, the connection will again be taken down and the system returned to normal.

Setting Up an Access Connection from the Switching System

Figure 4:
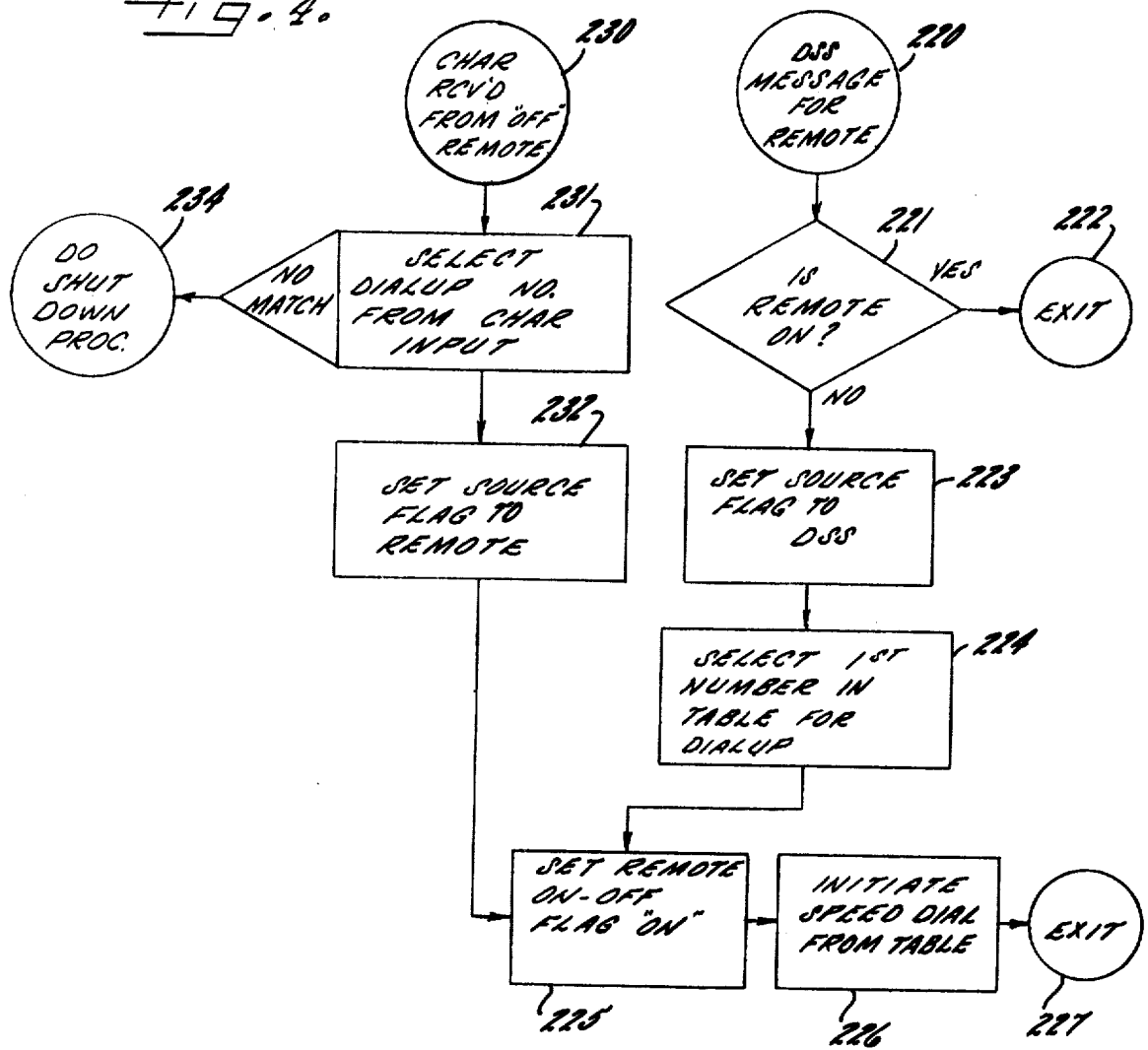

In order to assure security, access to the program memory is allowed only on connections set up in the outgoing direction from the switching system to numbers stored within the data memory of the switching system. Attention will first be directed to the relatively simple situation wherein an access connection is set up in response to a stimulus generated within the switching system. The stimulus itself may take various forms. For example, upon detection of a major fault, a data message is configured indicating the presence of "a digital switching system message for remote" 220 (FIG. 4). The stimulus may also be more mundane. For example, the control complex is configured to monitor an internal clock and to report the time of day periodically to the remote station, as an indication of the overall health of the system.

At any rate, when the system determines that a message is to be sent, the command "DSS message for remote" (FIG. 4) is produced and transmitted to the data base microprocessor. The data base microprocessor, under the control of its program memory executes the next program step 221 to determine "is remote on?". This step is accomplished by testing a software flag in the data base program memory which is reset when the remote terminal is off and set when a remote terminal is on. If the test is positive, indicating the remote is indeed on, there is no need to continue the program for establishing the data link, and the data base processor exits from the subprogram at 222, so that the data output subprogram can be invoked in its turn.

Assuming the test is negative, that is that no remote is on, the program progresses to the step 223 to execute the command "set source flag to DSS." That flag indicates that the connection was established in response to a stimulus generated within the digital switching system, rather than in response to a request from one of the remote stations. The program thereupon progresses to the step 224 which is "select first number in table for dialup." In the illustrated embodiment all of the remote terminals are treated as equal insofar as data access is concerned. Accordingly, when the switching system determines that a message is to be sent, it simply selects the first of the stored telephone numbers, and attempts to set up a connection to that terminal. If the attempt is successful, it transmits the message; if not it attempts the next stored number. After the telephone number of the remote is selected, the program progresses to step 225 to "set remote on-off flag 'on'". That flag, as will become more apparent, is tested whenever a character is received from a remote to determine whether that character should be passed to the common control for general processing, or simply tested for the purpose of setting up an access connection. After the flag is set, the program progresses to the step 226 which is "initiate speed dial with number from table."

As noted in the general description of the control complex, the speed dial function combines the capabilities of the data base and register microprocessors to outpulse a stored telephone number. The telephone number to be dialed is stored within the data base microprocessor, and when the state microprocessor determines that speed dial is to be accomplished, it causes the data base microprocessor to transfer the stored digits to the register microprocessor, such that the latter can use a receiver/sender to outpulse those digits. Naturally, before that occurs the state microprocessor sets up a connection in the network between a register 40a and an outgoing trunk circuit 35a (FIG. 3). Accordingly, the stored digits will be outpulsed by the register and into the central office 202, such that the telephone line of the authorized remote terminal 203 will be rung. The control complex 55, after the digits are dialed takes down the connection between the register 40a and the trunk circuit 35a and establishes a connection between the trunk circuit 35a and the line circuit 33a. After the remote terminal 203 answers, it is thereupon in communication with the control complex 55 via the modem 201 and the EIA port 200.

Setting Up An Access Connection In Response To A Request For Access

Assuming that the switching system received a call to the directory number assigned to data access, a request connection will be set up in the network between that incoming circuit and the modem. At that time the remote on-off flag will be in the off condition. In a subprogram to be described below, when a character is received on this new connection, the flag will be tested to produce a command 230 which indicates "character received from off remote." That command causes the program illustrated in FIG. 4 to advance to the step 231 where the received character is analyzed in the data base microprocessor. If the character matches the identity code associated with one of the authorized remote terminals, the program step indicating "select dial up number from character input" will be executed, causing the data base microprocessor to access its speed dial table to select the telephone number identified by the incoming character. Thereupon the program proceeds to step 232 which is "set source flag to remote." This is the same source flag referred to in program step 223, and when set to remote indicates that the access connection is being established in response to a request received from an authorized remote station. After the flag is set in step 232, the program continues with steps 225, 226 and 227 described previously, whereupon the remote on-off flag is set on, the speed dial function is initiated, and the sub-program exited so that the data input or data output sub-programs may be invoked in their turn.

Returning to the step 231, if the received character is not the identity code of one of the authorized remote terminals, a "no match" determination will be made, causing a branch to the shutdown procedure sub-program 234.

Shutdown Procedure

Figure 5:
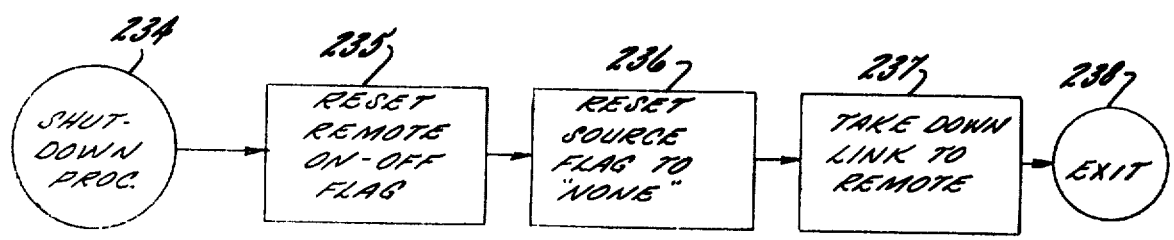

As illustrated in FIG. 5, upon entering the shutdown procedure sub-program, a first program step 235 is executed to "reset remote on-off flag." When executing the shutdown procedure from the branch illustrated in FIG. 4, that step is accomplished without effect because the remote on-off flag is in the reset state at that point. The program step 236 is also executed without effect because in the present condition the source flag is in the none condition.

But the program step 237, next executed, has an important effect because it accomplishes the function "take down link to remote." Accordingly, a command message will be sent to the state microprocessor to take down the link which is presently connecting the incoming circuit to modem. The initiating station will thereupon lose all access to the control complex, and the modem will be free to service new incoming or outgoing connections. After the connection is taken down, the sub-program exits at 238.

The Receive Character Sub-program

Figure 6:
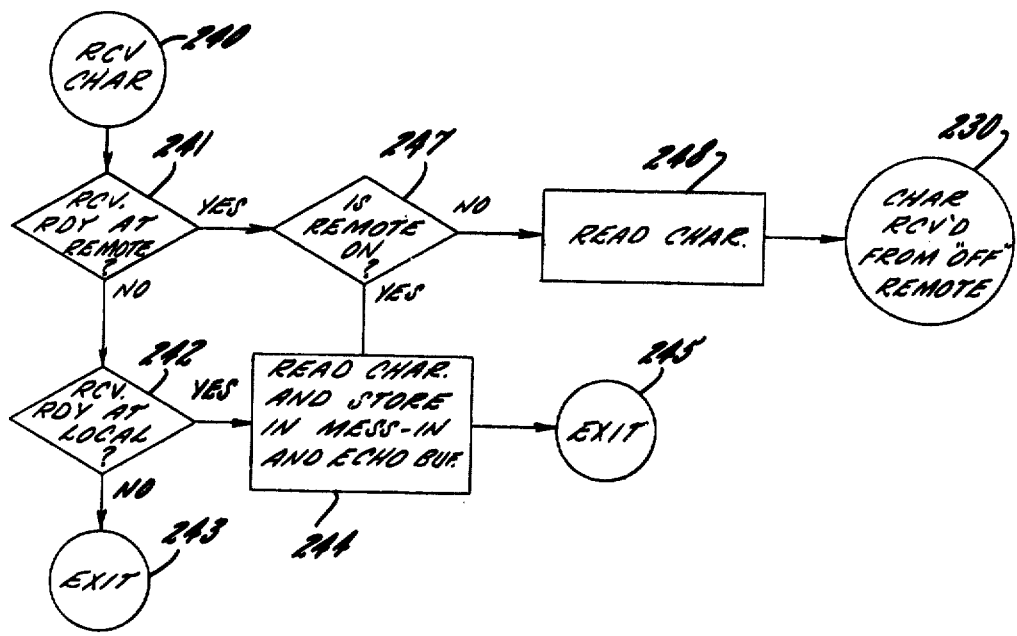

FIG. 6 illustrates the manner in which characters received from both the local and remote stations are processed by the common control. The program is initiated by a "receive character" command 240 periodically invoked by the data base microprocessor. A first test 241 is carried out to determine whether the receive ready status bit from the remote station indicates a character is ready for input to the control complex. As will be described below, that test is accomplished by reading a status byte in the EIA port. If the test is negative, the program then proceeds to step 242 whereupon the corresponding status byte for the local terminal is read. If the test is again negative, the indication is that no character is ready to be received from either port, and the program exits at 243 to return to other chores.

If the test at program step 242 is positive, the step 244 "read character and store in message-in and echo buffers" is executed. During this step the data base microprocessor accepts the data word from the EIA port and stores it in both the message-in and echo buffers. The message-in buffer is a means for transferring the character to the program memory of the control complex, while the echo buffer is a means for returning the character to both the local and remote (if connected) stations for printout. The sub-program thereupon exits at 245 so that the data base microprocessor may process the received character in accordance with other sub-programs.

Returning to the decision made at step 241, if the tested status byte indicated that the receive ready bit for the remote station was set, a further test 247 is executed to determine if the remote is on. That step is accomplished by testing a flag which is set at program step 225 of FIG. 4 and reset at program step 235 of FIG. 5. Accordingly, a positive answer to that test can only be produced if the connection on which the character was received was established by the switching system to an authorized remote station. If that is the case, the test will be positive and the step 244 will be executed such that the received data character will be allowed to enter the program memory of the data base microprocessor. If the test is negative, indicating that the character has been received on a request rather than an access connection, the character is still read at step 248, but the output command 230 is produced, indicating "character received from off remote." That command, it is recalled, thereupon causes the execution of the step 231 which analyzes the received character to determine whether or not an access connection should be set up.

Data Output To Local and Remote Terminals

The "output to local and remote terminals" command 250 of FIG. 7 initially causes a test in program step 251 to determine if the remote is on. That is accomplished by testing the flag which is set at program step 225 and reset at program step 235. If an access connection is not set up, the program will branch to a step 252 to read the local status byte to determine if the transmit circuitry of the local port is ready. Accordingly, no data can be output to the modem unless the remote on flag is set. If the test performed at step 252 is negative, the sub-program exits at 253 to execute other functions. Whenever the program has data to send it periodically returns to this sub-program to determine if the terminals are ready to receive such data. Upon generating a positive test in the step 252, the program progresses to step 253 to "retrieve character to be sent." That character is then transmitted to the local port in the step 254 whereupon the program exits at 255.

The output program of FIG. 7 is set up for the condition where the baud rate of the local port is equal to or greater than that of the remote port. In that case, only the remote ready flag need be tested when outputting data to both ports. Accordingly, if a positive test is generated in the program step 251, the program branches to a further test 257 to test the remote carried detect bit in the status byte. If the test is positive, indicating that the modem at the remote station is on line and returning carrier to the switching system, the program proceeds to a further test at step 258. That test reads the status byte to determine if the remote circuitry is ready to receive a character. If the test is negative, the program exits at 259 to return in due course in a further attempt to transmit the character. When the test is positive, a program step 260 analogous to program step 253 is executed to retrieve the character to be sent. A further test is performed at step 261 to determine if a character is available to be transmitted. If that test is positive, the steps 262, 263 are performed before the program exits at 264. The step 262 writes the character to the data word associated with the local port for transmission thereto while the step 263 writes the same word to the remote port for transmission to that port.

If after performance of the retrieve step 260 it is determined in the test 261 that no character is available, a further test is performed at step 265 to determine if the remote was turned on by the digital switching system. That is accomplished by testing the source flag to determine whether it is set to DSS, remote, or none. If the test 265 indicates that the access connection was established by the switching system itself, the program branches to the shutdown procedure 234. As shown in FIG. 5, the shutdown procedure at step 235 resets the remote on-off flag, such that further tests of that flag will be negative, resets the source flag to none at step 236, takes down the connection in the network to the remote station, and exits at 238. If the test, however, indicates that the remote was not turned on in response to a stimulus generated within the switching system, the sub-program exits at 266, leaving the connection intact. Accordingly, an access connection established in response to a request connection is controlled by the remote station and will not be taken down by the switching system without authorization from the remote station.

Returning now to the program step 257 which tests the status byte from the remote terminal to detect if carrier is present, if a negative indication is provided, the program branches to a further test at step 268 to determine whether the remote setup time has been exceeded. That test is responsive to an internal timer which establishes a maximum period for setting up of a remote connection. If the connection is not set up during the allowed period, a positive indication will be provided, causing a branch to the shutdown procedure 234. If the test is negative, the sub-program will exit at 269 to perform other functions. The branch including steps 268, 269 and 234 is also used to take down an access connection initially established in response to a request connection. When the remote station has completed the desired operations, it returns on hook, which terminates the carrier from the associated modem, and ultimately generates a negative test at step 257. If that test remains negative for the predetermined time period, the step 268 will generate a positive result, invoking the shutdown procedure 234.

The EIA Port

Figure 8:
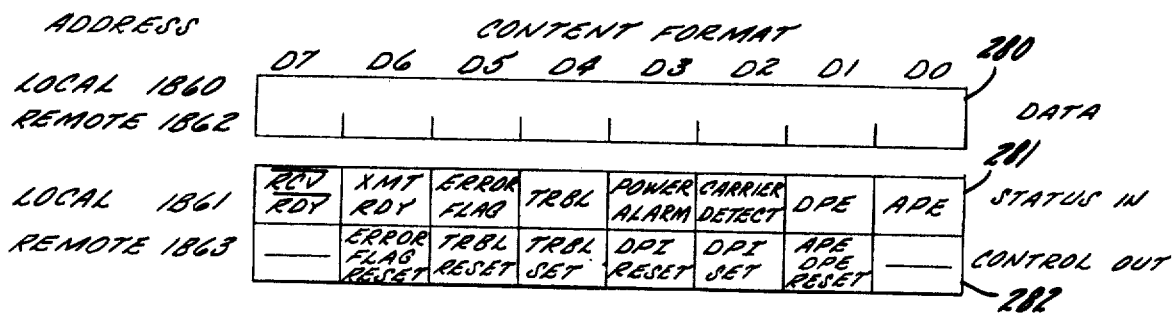
FIG. 8 is a chart illustrating the structure of the digital information words associated with the input/output ports of the common control.

FIG. 8 illustrates the structure of the digital words communicated between the EIA port and the data base microprocessor. The word 280 is an eight bit data word which is read from the port or written to the port in dependence upon the state of the read/write signal from the data base microprocessor. As indicated at the left of FIG. 8, the word is selectively written to the local and remote ports in dependence upon the state of the hexadecimal address. The word 281 is a status word read from the local or remote ports at the addresses indicated to determine the condition of those ports. The bits D0 and D1 are address parity error and data parity error respectively, indicating whether parity errors have been detected. The bit D2 is the carrier detect signal, for the remote port, that is, the signal tested at program step 257. Bits D3–D5 relate to other status points of the EIA port, including a power alarm, set in response to a power failure, a trouble flip flop, set in response to a major fault, and an error flag, set when data received at the port appears invalid. The bit D6 is the transmit ready bit tested for the local port at program 252 and for the remote port at program step 258. Finally, the bit D7 is the receive ready bit, tested for the remote and local ports at the program steps 241, 242 respectively.

A control byte 282 is also provided for communication between the data base microprocessor and the EIA port, including a bit D1 for resetting the parity error latches, bits D2 and D3 for setting and resetting respectively a data parity invert latch, bits D4 and D5 for setting and resetting respectively the trouble flip flop, and bit D6 for resetting the error flag.

It is worthy of note that the control complex 55, insofar as the remote station is concerned, remains completely passive while the remote station is attempting to set up an access connection. There are no program steps which instruct the remote station in the steps to be followed in setting up such connection. Accordingly, not only must the access connection come from an authorized station, but the person attempting access must know the procedure. If the receive character program of FIG. 6 generates a "character received from off remote" command 230, that command simply causes the test of the received character at the program step 231. Within a short time thereafter, and without any indication to the remote station, the speed dial function to the appropriate stored telephone number is initiated at program step 226. The remote station must have returned on hook after inputting the appropriate character and before the speed dial function is accomplished. If the remote station does not return on hook, the line will test busy at the central office and no connection will be established.

It will now be apparent that what has been provided is an improved remote access system for the stored program control complex of a telecommunications switching system, the system not only being simple to operate, but having a maximum degree of security from access by unauthorized persons.

We claim as our invention:

1. In a telecommunications switching system having a network for completing connections and a common control driven by a program stored in a program memory, the improvement comprising an input/output port for the common control, interface means for interfacing the input/output port and the network to allow connections to be set up in the network to the input/output port, the common control including means responsive to an incoming call to a predetermined directory number for setting up a request connection in the network between the incoming circuit and the interface means, means in the common control for analyzing data received on said request connection to detect a predetermined code, the common control having a memory for storing the telephone number of an authorized remote station, means activated by detection of the predetermined code for establishing a connection in the network and signaling the digits of the stored telephone number through said connection thereby to set up an access connection to the remote station when said remote station answers, and means for transferring data between the program memory and the remote station on said access connection, whereby the program memory is accessed only by the authorized remote station.

2. The improvement as set forth in claim 1 including means for disabling data output from said input/output port to said interface means during said request connection, thereby to maintain the switching system in a passive state during said request connection.

3. In a stored program common control telecommunications switching system, having a program memory for the common control and a network for establishing connections, the improvement comprising means for setting up a request connection in the network between an incoming circuit calling a predetermined directory number and an input/output port of the common control, means for setting up an access connection in the network between the input/output port and an authorized remote station, said last mentioned means including means for storing the telephone number of the authorized remote station and setting up said access connection only on outgoing calls to said stored number, means operative during a request connection solely for analysis of data received on said request connection for detecting a predetermined identity code, means actuated upon detection of said identity code for taking down the request connection and signaling the digits of the stored number to establish said access connection, and means operative solely during the maintenance of said access connection for transfer of data between the remote station and the program memory of the common control via the network connection.

4. The improvement as set forth in claim 3 wherein said means operative during a request connection includes means for taking down and signaling consecutively without instructing said remote station to return on hook.

5. The improvement as set forth in claim 3 wherein there are provided a plurality of authorized remote stations, each having an associated telephone number and an associated identity code, said means for storing including means for separately storing all of said telephone numbers, said means operative during a request connection including means for detecting an identity code received on a request connection for selecting the associated stored telephone number.

6. The improvement as set forth in claim 5 including means for disabling data output from the input/output port during said request connection so that the telecommunications switching system is passive during the request connection, providing no directions to a requesting station for establishing an access connection.

7. In a stored program common control telecommunications system having a network for establishing connections, a program memory for the common control, and interface means between the network and an input/output port of the common control for transfer of data through the network to the common control, the improvement comprising means for setting up a request connection in the network between an incoming call to a predetermined directory number and the interface means, means for storing the telephone number of an authorized remote station, means for setting up an access connection to the remote station in the network between the interface means on an outgoing call to the stored telephone number, indicator means set to one condition during an access connection and to another condition when an access connection is not set up, means for testing said indicator means upon receipt of data at said interface means, said means for testing responding to said one condition by enabling transfer of data between the program memory and the remote station connected in said network on said access connection, said means for testing responding to said other condition by enabling only the checking of received data to detect a predetermined indentity code and upon detection thereof activating the means for setting up an access connection and switching the indicator means to said one condition.

8. In a telecommunication switching system having a network for establishing connections, a stored program common control, and a program memory for the common control, the improvement comprising an input/output port for said program memory for allowing access thereto, interface means for interfacing the input/output port with the network so that connections can be set up in the network for data communication with the common control, means responsive to an incoming call to a predetermined directory number for establishing a connection in the network between the incoming circuit and the interface means, means for storing the telephone number of an authorized remote station; said common control including speed calling means for signaling said telephone number for establishing an outgoing connection to said remote station, means for establishing a connection in the network between said interface means and the outgoing circuit, means for distinguishing between an incoming call to the interface means for operating in a first mode and an outgoing call from said interface means for operating in a second mode, means operational in the first mode for analyzing incoming data to detect a predetermined code, means operational in the second mode for transferring data between the program memory and the remote station, and means operational in said first mode and responsive to the receipt of said predetermined code for establishing an outgoing connection and switching to said second mode.

9. A method of providing an authorized remote station access to the program memory of a common control telecommunications switching system, the system having a network for setting up connections, the method comprising the steps of storing the telephone number of the authorized station in the program memory, responding to an incoming call to a predetermined directory number by setting up an incoming connection to the common control solely for receipt of data, analyzing incoming data to detect an identification code, responding to detection of the identification code by setting up a new connection in the network to the authorized station using the stored telephone number, and transferring data between the program memory and the authorized station on said new connection.

10. The method as set forth in claim 9 wherein there are provided a plurality of authorized stations, said method including the steps of storing the telephone numbers of all of said authorized stations, associating respective identification codes with the telephone numbers and selecting the telephone number identified by a received identification code by signaling the digits of the associated telephone number.

11. A method of controlling access to the program memory of a stored program common control telecommunications system, the system having a network for establishing connections, and interface means for interfacing the network with an input/output port of the common control, the method comprising the steps of storing the telephone number of an authorized remote station in the program memory, setting up an incoming connection between the interface means and an incoming circuit in response to a call to a predetermined directory number, setting up an outgoing connection in the network and signaling the digits of the stored telephone number thereon to establish a connection between the interface means and the authorized station, setting a flag to the remote on condition for the duration of an outgoing connection to the remote station, enabling full transfer of data between the program memory and the remote station via the interface means whenever said flag is set to the remote on condition, denying said full transfer when the flag is in another condition but enabling limited transfer solely for analysis of incoming data to detect an identification code, and responding to receipt of the identification code for establishing said outgoing connection.

* * * * *